United States Patent [19]
Kurano

[11] Patent Number: 5,671,213
[45] Date of Patent: Sep. 23, 1997

[54] DUPLICATED ARRANGEMENT FOR ATM SWITCHING SYSTEM

[75] Inventor: Takatoshi Kurano, Tokyo, Japan

[73] Assignee: NEC Corporation, Tokyo, Japan

[21] Appl. No.: 552,533

[22] Filed: Nov. 6, 1995

[30] Foreign Application Priority Data

Nov. 4, 1994 [JP] Japan ................... 6-270988

[51] Int. Cl.[6] ................................... H04L 12/56
[52] U.S. Cl. .................. 370/218; 370/388; 370/398; 370/429
[58] Field of Search ................... 340/825.01, 825.02, 340/825.03, 826, 827; 395/181, 182.01, 182.02, 182.03; 370/217, 218, 219, 220, 355, 360, 386, 388, 389, 390, 395, 398, 412, 417, 428, 429

[56] References Cited

FOREIGN PATENT DOCUMENTS

4-86043  3/1992  Japan .

Primary Examiner—Alpus H. Hsu
Attorney, Agent, or Firm—Sughrue, Mion, Zinn, Macpeak & Seas

[57] ABSTRACT

In a duplicated arrangement for an ATM switching system, first and second store-and-forward buffers are provided for storing and forwarding an ATM cell stream and first and second counters are responsive to a timing signal for producing a first cell count and a second cell count representative of counts of cells stored in the first and second store-and-forward buffers, respectively. A detector is provided for detecting a difference between the first and second cell counts. A buffer controller controls the second store-and-forward buffer in accordance with the difference so that the count of cells in the second buffer approaches the count of cells in the first buffer. A switching circuit normally couples the ATM cell stream forwarded from the first buffer to an output port of the ATM switching system and couples the ATM cell stream forwarded from the second buffer, instead of from the first buffer, to the output port in response to a switching command signal.

21 Claims, 5 Drawing Sheets

DUPLICATED ARRANGEMENT FOR ATM SWITCHING SYSTEM

BACKGROUND OF THE INVENTION

1. Field of the Invention

The present invention relates generally to asynchronous transfer mode (ATM) switching systems, and more particularly to a duplicated ATM switching system for protection switching in the event of a failure in a working unit.

2. Description of the Related Art

In a duplicated ATM switching system it is necessary to ensure that there is no cell loss when a protection switching occurs. Japanese Provisional Patent Publication Hei-4-86043 discloses a duplicated output buffer ATM switching system using a timing cell multiplexed with an ATM cell stream entering a working output buffer when a maintenance center is alarmed with a failure in the system. At the instant the timing cell is multiplexed with ATM cells, the application of ATM cells to the working output buffer is stopped so that the timing cell is the last in a series of cells in the working output buffer. At the same time, the multiplexed timing cell and ATM cells that follow are supplied to a spare output buffer so that the timing cell in the spare output buffer is the first in a series of cells. A selector is connected to the outputs of the working output buffer and the spare output bier. Protection switching carried out by the selector when it detects a timing cell from the spare output buffer.

However, one disadvantage of the prior art system is that since the spare buffer is empty or contains a small number of insignificant cells at the instant the timing cell is produced while the working buffer contains active ATM cells, the timing cells from both buffers may not arrive simultaneously at the selector, and hence an interruption occurs in an outgoing cell stream.

Figure 1:
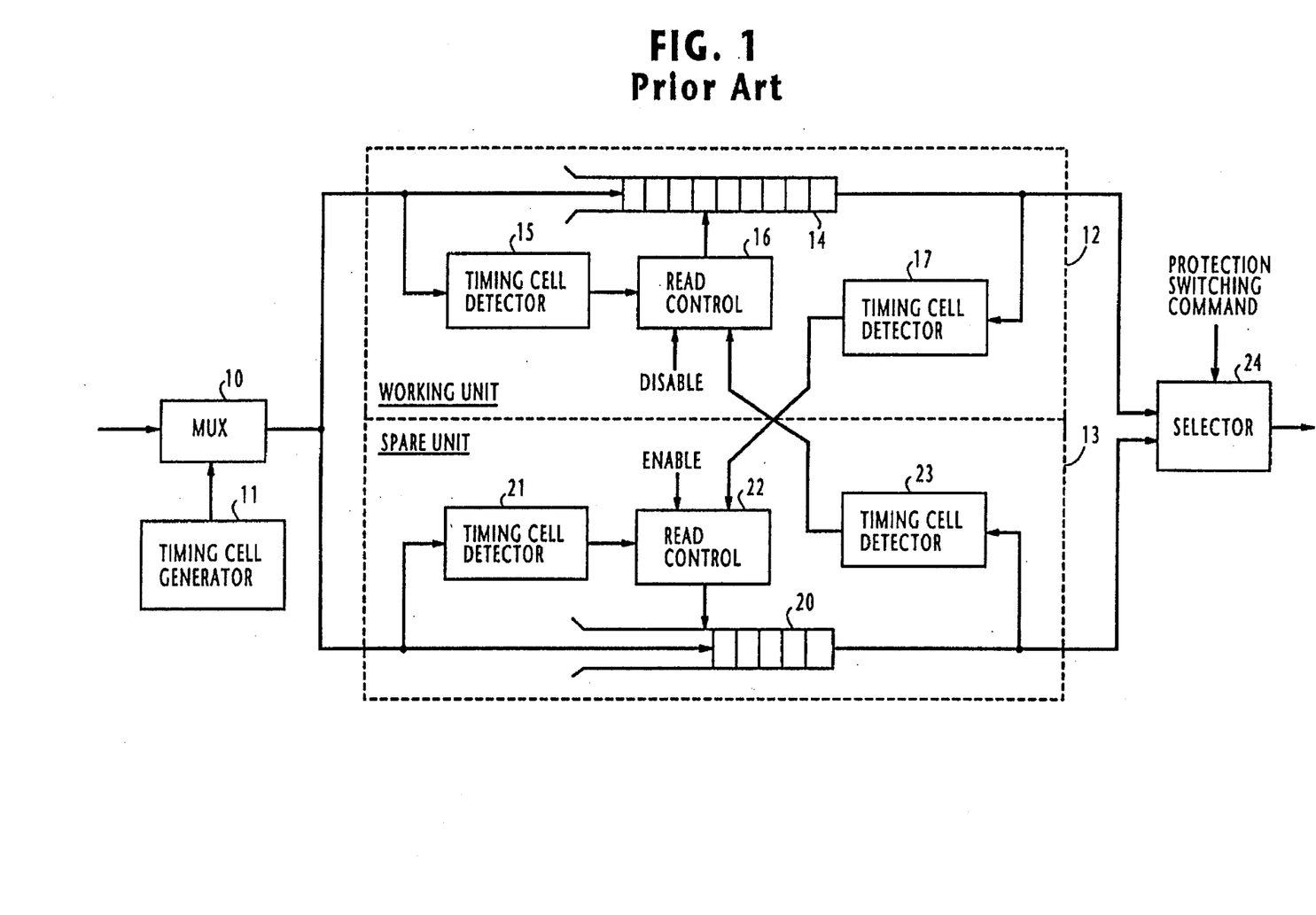
FIG. 1 is a block digram of a prior art duplicated buffer units in a duplicated ATM switching system.

To overcome the prior art shortcoming, a duplicated ATM switching system of an output buffer type has been contemplated and a portion of this system is shown in FIG. 1. This system includes a multiplexer 10 where a timing cell is supplied at periodic intervals from a timing cell generator 11 and multiplexed with a stream of ATM cells, the multiplexed cells being supplied to a working buffer unit 12 as well as to a spare buffer unit 13. Working buffer unit 12 includes an output buffer (first-in-first-out) 14, an incoming timing cell detector 15 connected to the input of buffer 14, a read controller 16 and an outgoing timing cell detector 17 connected to the output of the buffer 14. In a similar manner, the spare buffer unit 13 includes a first-in-first-out (FIFO) buffer 20, an incoming timing cell detector 21 connected to the input of the buffer 20, a read controller 22 and an outgoing timing cell detector 23 connected to the output of the buffer 20. The output of multiplexer 10 is stored in buffers 14 and 20 and read out therefrom according to the first-in-first-out principle. The read controller 16 is set in a disabled state when operating in active mode so that it is not responsive to the outputs of timing cell detectors 15 and 23. On the other hand, the read controller 22 is set in an enabled state when operating in a standby mode to respond to the outputs of the timing cell detectors 21 and 17. When an incoming timing cell is detected by detector 21, the read controller 22 clears the buffer 20 and when an outgoing timing cell is detected by detector 17, the read controller 22 starts a read operation of the buffer 20. In this way, the timing cells from both buffers arrive at the sane time at the selector 24 and the selector provides protection switching from the output of buffer 14 to the output of buffer 20. When this occurs, the buffer 14 operates in a standby mode and the read controller 16 is set in an enabled state, while the buffer 20 operates in a working mode and the read controller 22 is set in a disabled state.

For proper operation of the protection switching arrangement, the operating speed of each of the outgoing timing cell detectors must be such that the detection of an outgoing timing cell be communicated to the other within the time which would be taken for a single cell to enter and leave a buffer. If the operating speed of the ATM switching system increases, a difficulty arises in implementing a practical protection switching arrangement,

SUMMARY OF THE INVENTION

It is therefore an object of the present invention to provide a duplicated arrangement for ATM switching systems capable of operating at high speeds.

According to the present invention, there is provided a protection switching arrangement for an ATM switching system, the arrangement comprising first and second store-and-forward buffers for storing and forwarding an ATM cell strum, means for producing a timing signal, and first and second counters responsive to a timing signal for producing a first cell count and a second cell count representative of counts of cells stored in the first and second store-and-forward buffers, respectively. A detector is provided for detecting a difference between the first and second cell counts and a buffer controller controls the second store-and-forward buffer in accordance with the difference so that the count of cells in the second store-and-forward buffer approaches the count of cells in the first store-and-forward buffer. A protection switching circuit normally couples the ATM cell stream forwarded from the first store-and-forward buffer to an output port of the ATM switching system and in the event of a system failure, couples the ATM cell stream forwarded from the second store-and-forward buffer, instead of from the first store-and-forward buffer, to the output port.

Additionally, a comparator may be provided for comparing the first cell count with a threshold value and disabling the buffer controller when the first cell count is smaller than the threshold value. The means for producing a timing signal produces a timing cell and includes a multiplexer for multiplexing the timing cell with ATM cells to produce a multiplexed ATM cell stream, and a cell detector for detecting a timing cell multiplexed in the ATM cell stream. The first and second cell counters are responsive to the timing cell detected by the cell detector for producing the first and second cell counts. The first and second store-and-forward buffers are connected together to the multiplexer for storing and forwarding the multiplexed ATM cell stream. The protection switching circuit is responsive to a timing cell forwarded from one of the buffers for coupling the ATM cell stream forwarded from the second store-and-forward buffer to the output port.

BRIEF DESCRIPTION OF THE DRAWINGS

The present invention will be described in further detail with reference to the accompanying drawings, in which.

DETAILED DESCRIPTION

Figure 2:
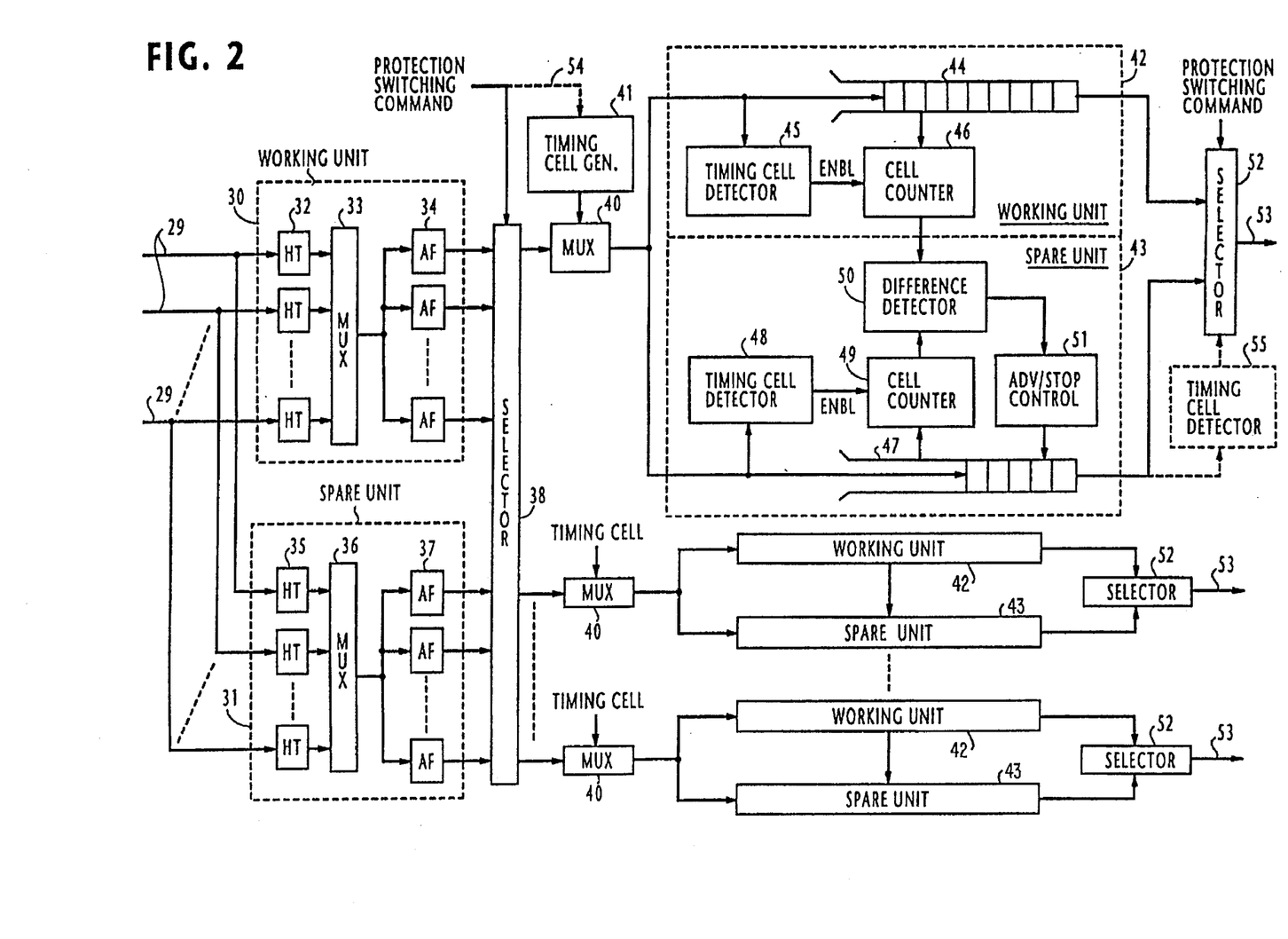
FIG. 2 is a block diagram of a duplicated output buffer type ATM switching system incorporating one embodiment of the present invention.

Referring now to FIG. 2, there is shown a duplicated ATM switching system incorporating the present invention in an output buffer (queuing) arrangement. The output buffer ATM switching system includes an incoming stage 30 of working unit and a duplicated, incoming stage 31 of spare unit operating in what is called a "hot-standby" mode. Incoming stage 30 is made up of plurality of header translators 32 connected to receive incoming ATM cell from associated input ports 29. The outputs of header translation 32 are time-division multiplexed in a multiplexer 33 and supplied through a TDM (time division multiplex) bus to a bank of address filters 34 for extracting ATM cells having the same address as the filters. Spare-unit incoming stage 31 is identically constructed to working-unit incoming stage 30 by header translators 35, a multiplexer 36 and address filters 37.

A selector 38 is provided for normally coupling the outputs of the working unit address filters 34 respectively to multiplexers 40 and coupling the outputs of the spare unit address filters 37 to multiplexers 40 in response to a protection switching command. A timing cell generator 41 periodically supplies a timing cell to multiplexers 40 where the timimg cell is multiplexed with an incoming ATM cell stream. The output of each multiplexer 40 is connected to a set of working buffer unit 42 and spare buffer unit 43. The working buffer unit 42 comprises a buffer 44 for buffering cells from multiplexer 40. A timing cell detector 45 is provided for detecting a timing cell from the output of multiplexer 40. A cell counter 46 is connected to the buffer 44 to produce a signal representing the number of cells retraining in the buffer. Spare buffer unit 43 includes a buffer 47, a timing cell detector 48 and a cell counter 49 which are arranged in a manner similar to the working unit 42, but additionally includes a difference detector 50 and an advance/stop controller 51.

Cell counter 46 is enabled in response to the detection of a timing cell by timing cell detector 45 for determining the number of cells stored in the working output buffer 44, and cell counter 49 is enabled in response to the detection of a timing cell by timing cell detector 48 for determining the number of cells scored in the spare output buffer 47. Difference detector 50 is connected between the outputs of cell counters 46 and 49 to produce a signal representative of the number of cells in the spare output buffer 47 which are more or less than the number of cells in the working output buffer 44. Advance/stop controller 51 is supplied with the output of the difference detector 50 to provide an advance command to buffer 47 when the output of cell counter 49 is greater than that of cell counter 46 or a stop command when the output of cell counter 49 is smaller than that of cell counter 46.

The advance command causes buffer 47 to advance its read address pointer by an amount corresponding to the number of cells by which amount its cell count is greater than the cell count of buffer 44. The stop command causes buffer 47 to freeze its read address pointer for an interval corresponding to the number of cells in buffer 47 by which amount its cell count is smaller than the cell count of buffer 44. Similar read control operations proceed in other working units 42 and spare units 43 in response to the mine timing cell produced by timing cell generator 41. Selector 52 responds to a protection switching command pulse supplied from a maintenance center, not shown, by coupling the spare output buffer 47, instead of the working output buffer 44, to the associated out-put port 53. At the same time the selector 38 responds to the protection switching command pulse for coupling the outputs of spare input stage 31 to multiplexers 40, instead of the outputs of the working input stage 30.

It will be appreciated that, since the advance/stop control is performed on the basis of the difference between the lengths of output queues in both working and spare output buffers, the speed of the read timing adjustment is not required to be increased correspondingly to the operating speed of the ATM switching system.

In addition, the spare unit 43 is allowed a sufficient time to effect read timing adjustment corresponding to the amount of cells in the working unit 42. As a result, the timing cell generator 41 may be triggered by the protection switching command pulse to produce a single timing cell as indicated by a dotted line 54 and a timing cell detector 55 is optionally connected to the output of spare buffer 47 to cause selector 52 to provide protection switching in response to the detection of a timing cell, instead of to the protection switching command pulse.

Figure 3:
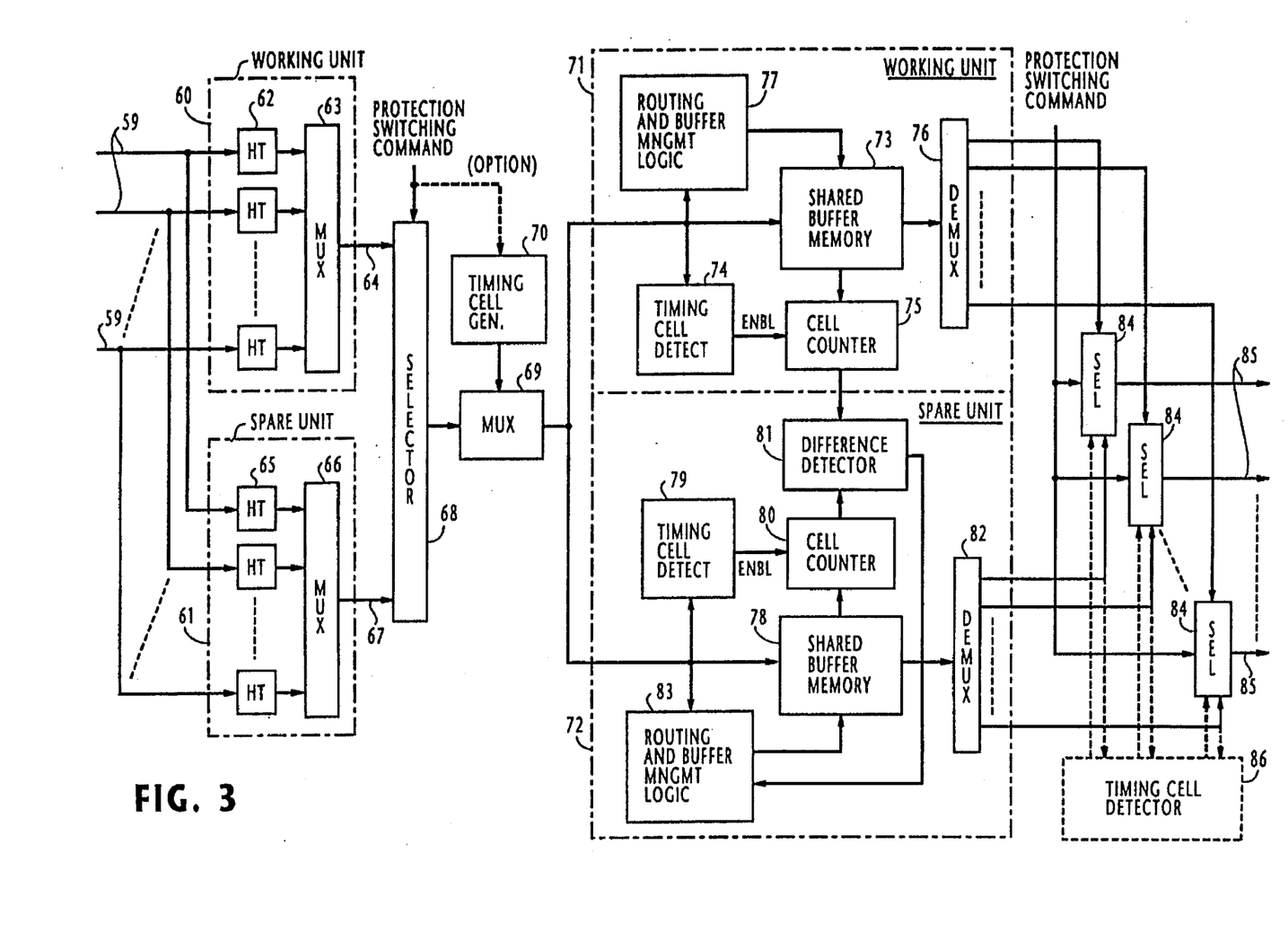
FIG. 3 is a block diagram of a duplicated shared buffer type ATM switching system incorporating the present invention.

The present invention can be incorporated in a shared buffer ATM switching system as shown in FIG. 3. The system includes a working input stage 60 and a spare input stage 61. The working input stage 60 has a bank of header translators 62 connected to input ports 59, and a multiplexer 63 for combining the outputs of header translators 62 into a multiplexed ATM cell stream onto a TDM bus 64, and the spare input stage 61 has a bank of header translators 65 connected to input ports 59, and a multiplexer 66 for combining the outputs of header translators 65 into a multiplexed ATM cell stream onto a TDM bus 67. The TDM bus 64 is normally connected through a selector 68 to a multiplexer 69 where the multiplexed stream is combined with a timing cell periodically produced by a timing cell generator 70.

A working unit 71 and a spare unit 72 are connected to the output of multiplexer 69. Working unit 71 has a shared buffer memory 73, a timing cell detector 74, a cell counter 75, a demultiplexer 76, and a routing and buffer management (RBM) logic 77. The shared buffer memory 73 is a random-in-random-out buffer. For each cell the RBM logic 77 analyzes the cell header and routes the cell to a logical buffer (queue) formed in the shared buffer memory 73 corresponding to an output port of the system. Shared buffer memory 73 is controlled by the RBM logic 77 which is responsible for controlling the free and occupied cell locations of the logical queue. Cell counter 75 is connected to the shared buffer memory 73 to provide a cell count value for rich logical queue when enabled in response to the detection of a timing cell by timing cell detector 74. Since a plurality of logical buffers are formed in the memory 73, a timing cell is placed in each logical queue along with ATM cells. The output of the shared buffer memory is connected to the demultiplexer 76 where the cells from the memory are demultiplexed according to their cell headers and supplied to selectors 84 which are connected respectively to output ports 85.

Spare unit 72 has a shared buffer memory 78, a timing cell detector 79, a cell counter 80, a difference detector 81, a demultiplexer 82 and a RBM logic 83 that provides routing and buffer management for each cell in the shared buffer memory 78. Similar to cell counter 75, cell counter 80 provides a cell count value of each logical queue in the shared buffer memory 78 when enabled in response to the detection of a timing cell by timing cell detector 79. Difference detector 81 is connected between the outputs of cell counters 75 and 80 to produce a plurality of difference signals each indicating the difference between the cell count of each logical queue in memory 75 and the cell count of a corresponding logical queue in memory 78. In response to the difference signals, the RBM logic 83 controls the logical queues in memory 78 by advancing the read address pointer of each spare logical queue by an amount corresponding to the number of cells in the span logical queue by which amount its cell count is greater than the cell count of the corresponding working logical queue, or freezing the address pointer for an interval corresponding to the number of cells in the spare logical queue by which amount its cell count is less than the cell count of the corresponding working logical queue.

The output of the shared buffer memory 78 is decomposed into individual ATM cells by demultiplexer 82 according to cell headers and supplied to all selectors 84, to which a protection switching command pulse is applied as in the case of the output buffer ATM switching system. As an option, the timing cell generator 70 is responsive to the protection switching command pulse for producing a timing cell and a timing cell detector 86 is connected to the outputs of demultiplexer 82 to detect a timing cell and cause each selector 84 to provide protection switching.

If the mount of cells in the active buffer 44 is small, there is not sufficient time to complete the advance/stop control of the span buffer 47. Under such circumstances it is desirable to suspend the advance/stop control until the active buffer 44 is filled with a sufficient amount of cells.

Figure 4:
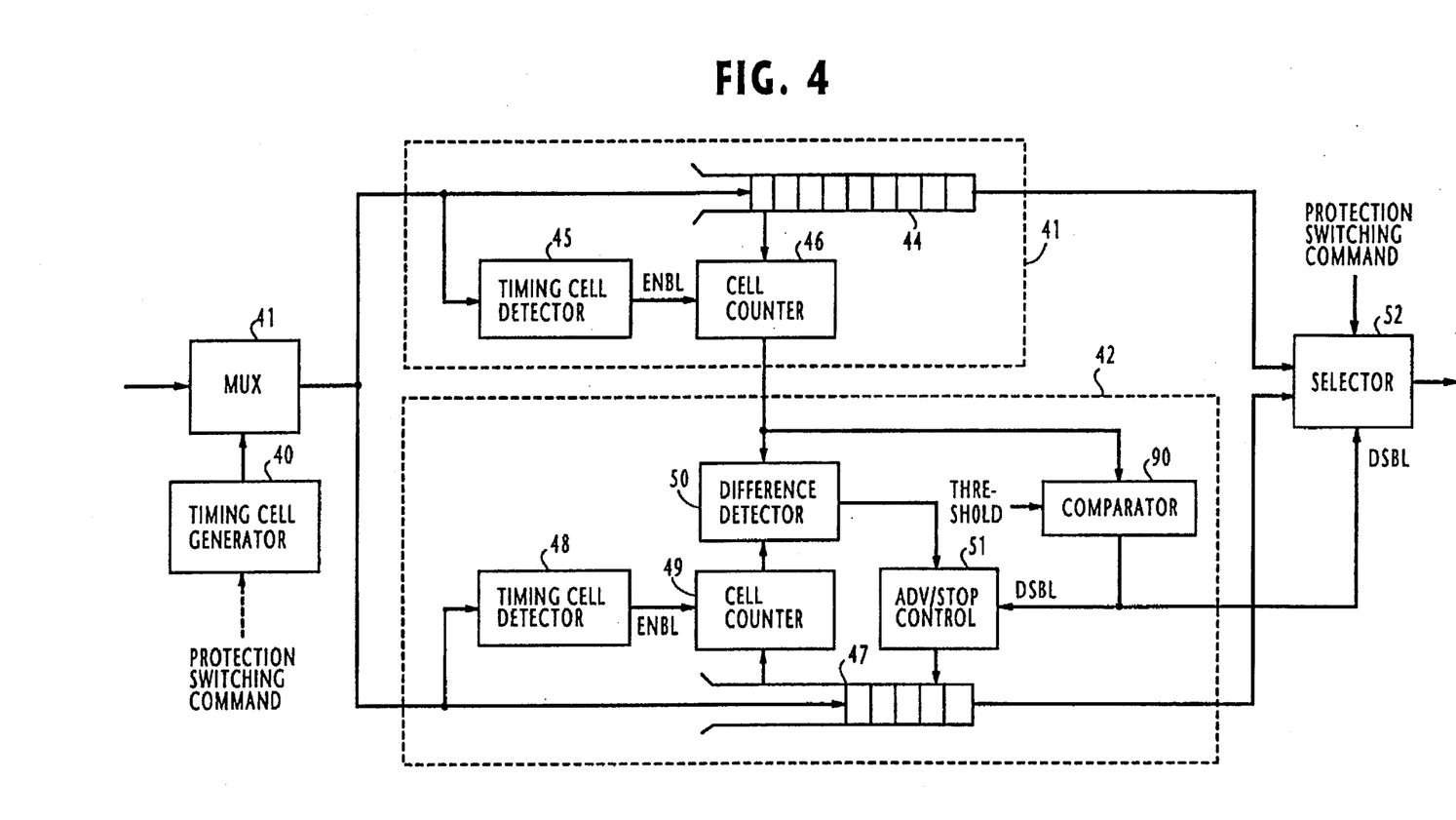
FIG. 4 is a block diagram of a modified embodiment of the present invention incorporated into an output buffer type ATM switching system.
Figure 5:
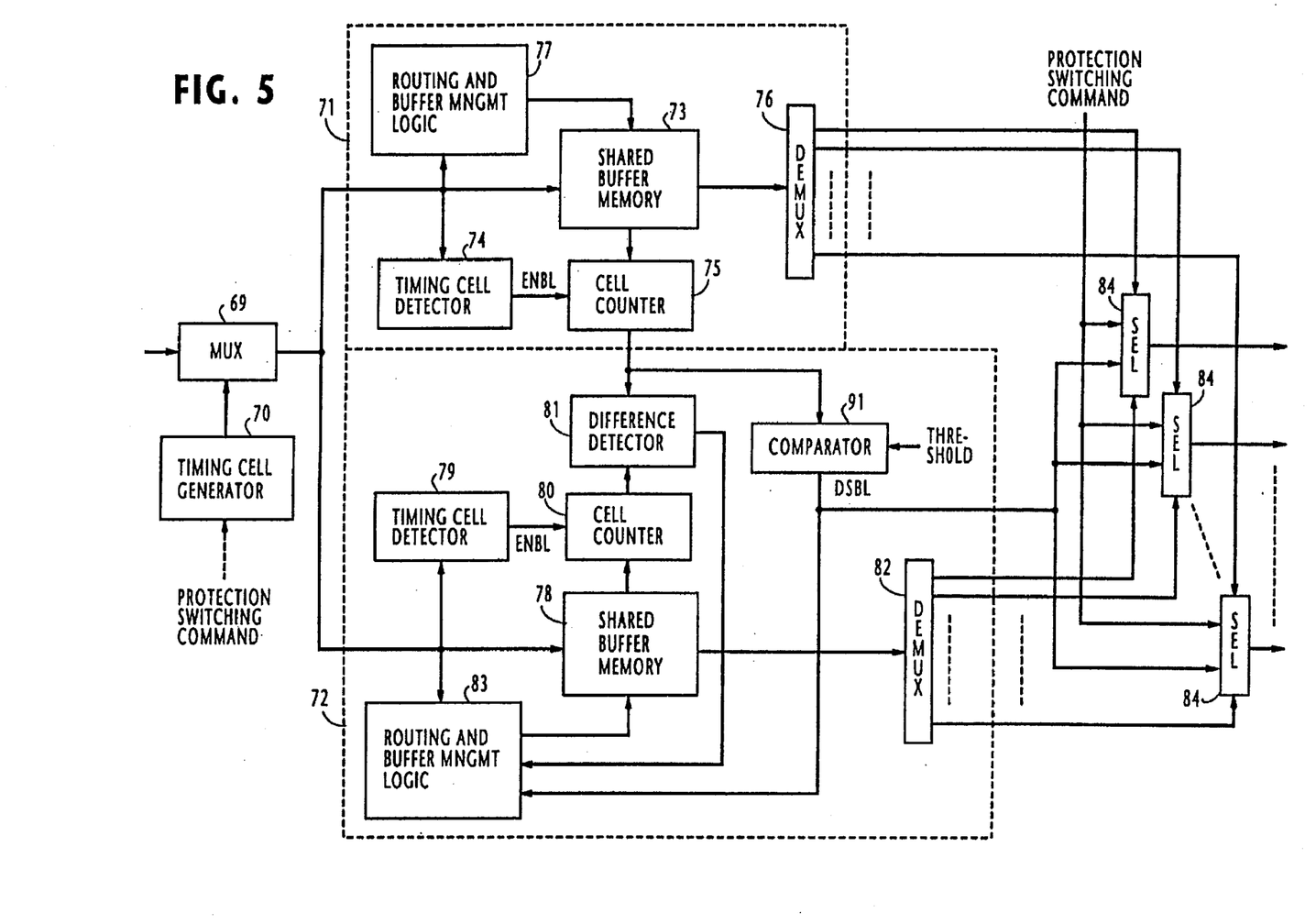
FIG. 5 is a block diagram of a modified embodiment of the present invention incorporated into a shared buffer type ATM switching system.

To this end, the output buffer ATM switching system of FIG. 2 is modified as shown in FIG. 4. In this modification, the spare buffer unit 42 further includes a comparator 90 connected to the output of active cell counter 46 for making a comparison with a predetermined threshold. Comparator 90 produces an output when the cell count of active buffer 43 is lower than the threshold, the output being supplied to the advance/stop controller 51 and selector 52 to disable their operation. In a similar manner, the shared buffer ATM switching system of FIG. 3 is modified as shown in FIG. 5. A comparator 91 is provided in the spare unit 72 to compare the cell count of each logical queue in the working shared buffer memory 73 with a threshold value and supplies a disable signal to the routing and buffer management logic 83 and to a corresponding one of the selectors 84 when the cell count of that logical queue is smaller than the threshold. The RBM logic 83 is thus prevented from responding to a corresponding difference signal to suspend the advance and stop control of the corresponding logical buffer in the spare shared buffer memory 78 as long as the cell count of the logical queue in that logical queue is smaller than the threshold value.

What is claimed is:

1. A switching arrangement for an asynchronous transfer mode (ATM) switching system, comprising:
    first and second store-and-forward buffers for storing and forwarding an ATM cell stream;
    a timing signal generator;
    first and second counters responsive to said timing signal for producing a first cell count and a second cell count representative of numbers of cells stored in said first and second store-and-forward buffers, respectively;
    a difference detector for detecting a difference between said first and second cell counts;
    a controller for controlling said second store-and-forward buffer in accordance with said difference so that said number of cells in said second store-and-forward buffer approaches said number of cells in said first store-and-forward buffer, wherein said controller advances or stops storing and forwarding by said second store-and-forward buffer in accordance with said difference; and
    a switch for normally coupling said ATM cell stream forwarded from said first store-and-forward buffer to an output port of said ATM switching system and coupling said ATM cell stream forwarded from said second store-and-forward buffer, instead of from said first store-and-forward buffer, to said output port in response to a switching command signal.

2. A switching arrangement as claimed in claim 1, further comprising a comparator for comparing said first cell count with a threshold value and disabling said controller when said first cell count is smaller than said threshold value.

3. A switching arrangement for an asynchronous transfer mode (ATM) switching system, comprising:
    first and second store-and-forward buffers for storing and forwarding an ATM cell stream;
    a timing signal generator for producing a plurality of timing cells, a mulitplexer for multiplexing said timing cells with ATM cells to produce a multiplexed ATM cell streams, and a timing cell detector for detecting said timing cells multiplexed in said ATM cell stream;
    first and second cell counters responsive to said timing cells detected by said timing cell detector for producing first cell count and second cell count representative of numbers of cells stored in said first and second store-and-forward buffers, respectively;
    a difference detector for detecting a difference between said first and second cell counts;
    a controller for controlling said second store-and-forward buffer in accordance with said difference so that said number of cells in said second store-and-forward buffer approaches said number of cells in said first store-and-forward buffer; and
    a switch for normally coupling said ATM cell stream forwarded from said first store-and-forward buffer to an output port of said ATM switching system and coupling said ATM cell stream forwarded from said second store-and-forward buffer, instead of from said first store-and-forward buffer, to said output port in response to a switching command signal.

4. A switching arrangement as claimed in claim 3, wherein said first and second store-and-forward buffers are connected together to said multiplexer for storing and forwarding said multiplexed ATM cell stream, said switch being responsive to one of said timing cells forwarded from one of said buffers for coupling said ATM cell stream forwarded from said second store-and-forward buffer to said output port.

5. A switching arrangement as claimed in claim 3, wherein said timing cell generator produces said timing cells at periodic intervals.

6. A switching arrangement as claimed in claim 3, wherein said first and second store-and-forward buffers are connected together to said multiplexer for storing and forwarding said ATM cell stream, and said timing cell generator producing said timing cells at periodic intervals, said switch being responsive to a simultaneous presence of one of said timing cells forwarded from one of said buffers and a switching command signal for coupling said ATM cell stream forwarded from said second store-and-forward buffer to said output port.

7. A switching arrangement as claimed in claim 3, wherein said first and second store-and-forward buffers are connected together to said multiplexer for storing and forwarding said ATM cell stream, and said timing cell generator producing said timing cells at periodic intervals, said switch being responsive to a simultaneous presence of one of said timing cells forwarded from one of said buffers and a switching command signal for coupling said ATM cell stream forwarded from said second store-and-forward buffer to said output port, further comprising a comparator for comparing said first cell count with a threshold value and disabling said controller and said switch when said first cell count is smaller that said threshold value.

8. An output buffer asynchronous transfer mode (ATM) switching system comprising:

a first switching stage for receiving ATM cells from a plurality of input ports;

a second switching stage for also receiving ATM cells from said input ports;

first switch having a plurality of terminals for normally coupling said ATM cells from said first switching stage to said terminals and coupling said ATM cells from said second switching stage to said terminals, instead of from said first switching stage, in response to a switching command signal;

a plurality of first store-and-forward buffers respectively connected to said terminals for storing and forwarding ATM cells from said terminals;

a plurality of second store-and-forward buffers respectively connected to said terminals for storing and forwarding ATM cells from said terminals, said second store-and-forward buffers corresponding respectively to said first store-and-forward buffers;

a timing signal generator;

a plurality of working units associated with said first store-and-forward buffers, respectively, each of said working units including a first counter responsive to said timing signal for producing a first cell count representative of a number of cells stored in an associated store-and-forward buffer;

a plurality of spare units associated with said second store-and-forward buffers, respectively, each of said spare units including a second counter responsive to said timing signal for producing a second cell count representative of a number of cells stored in an associated second store-and-forward buffer, a difference detector for detecting a difference between said first and second cell counts, and a controller for controlling the associated second store-and-forward buffer in accordance with said difference so that said number of cells in said corresponding second store-and-forward buffer approaches said number of cells stored in said corresponding first store-and-forward buffer;

a plurality of second switches for normally coupling said ATM cell streams forwarded from said first store-and-forward buffers to output ports of said ATM switching system and coupling said ATM cell streams forwarded from said second store-and-forward buffers, instead of from said first store-and-forward buffers, to said output ports in response to said switching command signal.

9. An output buffer ATM switching system as claimed in claim 8, wherein each of said spare units further includes a comparator for comparing said first cell count with a threshold value and disabling said controller when said first cell count is smaller than said threshold value.

10. An output buffer asynchronous transfer mode (ATM) switching system comprising:

a first switching stage for receiving ATM cells from a plurality of input ports;

a second switching stage connected in parallel to said first switching stage for receiving ATM cells from said input ports;

a first switch having a plurality of terminals for normally coupling said ATM cells from said first switching stage to said terminals and coupling said ATM cells from said second switching stage to said terminals, instead of from said first switching stage, in response to a switching command signal;

a plurality of first store-and-forward buffers respectively connected to said terminals for storing and forwarding ATM cells from said terminals;

a plurality of second store-and-forward buffers respectively connected to said terminals for storing and forwarding ATM cells from said terminals, said second store-and-forward buffers corresponding respectively to said first store-and-forward buffers;

a plurality of working units associated with said first store-and-forward buffers, respectively, each of said working units including a first counter responsive to said timing signal for producing a first cell count representative of a number of cells storing in an associated store-and-forward buffer;

a plurality of spare units associated with said second store-and-forward buffers, respectively, each of said spare units including a second counter responsive to said timing signal for producing a second cell count representative of a number of cells stored in an associated second store-and-forward buffer, a difference detector for detecting a difference between said first and second cell counts, and a controller for controlling the associated second store-and-forward buffer in accordance with said difference so that said number of cells in said corresponding second store-and-forward buffer approaches said number of cells in said corresponding first store-and-forward buffer;

a timing signal generator for producing a plurality of timing cells;

a plurality of multiplexers for multiplexing said timing cell with ATM cell streams from said terminals to produce a plurality of multiplexed ATM cell streams;

one of said working and spare units including a timing cell detector for detecting said timing cells multiplexed in said ATM cell streams, said first and second cell counters being responsive to said timing cells detected by said timing cell detecting means for producing said first and second cell counts; and a plurality of second switches for normally coupling said ATM cell streams forwarded from said first store-and-forward buffers to output ports of said ATM switching system and coupling said ATM cell streams forwarded from said second store-and-forward buffers, instead of from said first store-and-forward buffers, to said output ports in response to a switching command signal.

11. An output buffer ATM switching system as claimed in claim 10, wherein each of said first store-and-forward buffers and each respective corresponding second store-and-forward buffer are connected together to a respective one of said multiplexers for storing and forwarding a multiplexed ATM cell stream, each of said second switches being responsive to one of said timing cells contained in an ATM cell stream for coupling said ATM cell stream from a corresponding one of said second store-and-forward buffers to a corresponding one of said output ports.

12. An output buffer ATM switching system as claimed in claim 10, wherein said timing cell generator produces said timing cell at periodic intervals.

13. A shared buffer asynchronous transfer mode (ATM) switching system comprising:

a first multiplexer stage for multiplexing ATM cells from a plurality of input ports;

a second multiplexer stage for also multiplexing ATM cells from said input ports;

a first switch having a terminal for normally coupling said ATM cells from said first multiplexer stage to said terminal and coupling said ATM cells from said second multiplexer stage to said terminal, instead of from said first multiplexer stage, in response to a switching command signal;

a first shared buffer memory for storing and forwarding ATM cells from said terminal;

a second shared buffer memory connected to said second multiplexer stage for storing and forwarding ATM cells from said terminal;

a first buffer management logic circuit for controlling management of said first shared buffer memory so that a plurality of first logical buffers are formed in said first shared buffer memory for storing ATM cell streams in said first logical buffer and forwarding said ATM streams therefrom;

a second buffer management logic circuit for controlling management of said second shared buffer memory so that a plurality of second logical buffers are formed in said second shared buffer memory for storing ATM cell streams in said second logical buffers and forwarding said ATM cell streams therefrom, said second logical buffers corresponding respectively to said first logical buffers;

a timing signal generator;

a first counter responsive to said timing signal for producing first cell counts, each first cell count representative of a number of cells stored in a corresponding one of said first logical buffers;

a second counter responsive to said timing signal for producing second cell counts, each second cell count representative of a number of cells stored in a corresponding one of said second logical buffers;

a difference detector for detecting differences between said first cell counts and said second cell counts and controlling said second buffer management logic circuit in accordance with said differences so that said number of cells in said second logical buffers approach said number of cells in said corresponding first logical buffers;

a first demultiplexer stage connected to said first shared buffer memory for demultiplexing ATM cells therefrom;

a second demultiplexer stage connected to said second shared buffer memory for demulitplexing ATM cells therefrom;

a plurality of second switches for normally coupling ATM cell streams from said first demultiplexer stage to output ports of said ATM switching system and coupling ATM cell streams from said second demultiplexer stage, instead of from said first demultiplexer stage, to said output ports in response to said switching command signal.

14. A shared buffer ATM switching system as claimed in claim 13, further comprising comparator for comparing each of said first cell counts with a threshold value and preventing said second buffer management logic from responding to a corresponding one of said differences when one of said first cell counts is smaller than said threshold value.

15. A shared buffer asynchronous transfer mode (ATM) switching system comprising:

a first multiplexer stage for multiplexing ATM cells from a plurality of input ports;

a second multiplexer stage for also multiplexing ATM cells from said input ports;

a first switch having a terminal for normally coupling said ATM cells from said first multiplexer stage to said terminal and coupling said ATM cells from said second multiplexer stage to said terminal, instead of from said first multiplexer stage, in response to a switching command signal;

a first shared buffer memory for storing and forwarding ATM cells from said terminal;

a second shared buffer memory connected to said second multiplexer stage for storing and forwarding ATM cells from said terminal;

a first buffer management logic circuit for controlling management of said first shared buffer memory so that a plurality of first logical buffers are formed in said first shared buffer memory for storing ATM cell streams in said first logical buffer and forwarding said ATM streams therefrom;

a second buffer management logic circuit for controlling management of said second shared buffer memory so that a plurality of second logical buffers are formed in said second shared buffer memory for storing ATM cell streams in said second logical buffers and forwarding said ATM cell streams therefrom, said second logical buffers corresponding respectively to said first logical buffers;

a timing signal generator having a timing cell generator for generating a plurality of timing cells; a multiplexer for multiplexing said timing cells with ATM cells from said terminal of said first switch to produce a multiplexed ATM cell stream; and a timing cell detector for detecting a timing cell multiplexed in said ATM cell stream;

a first counter responsive to said timing signal for producing first cell counts, each first cell count representative of a number of cells stored in a corresponding one of said first logical buffers;

a second counter responsive to said timing signal for producing second cell counts, each second cell count representative of a number of cells stored in a corresponding one of said second logical buffers; said first and second cell counters being responsive to said timing cells detected by said timing cell detector for producing said first and second cell counts a difference detector for detecting differences between said first cell counts and said second cell counts and controlling said second buffer management logic circuit in accordance with said differences so that said number of cells in said second logical buffers approach said number of cells in said corresponding first logical buffers;

a first demultiplexer stage connected to said first shared buffer memory for demultiplexing ATM cells therefrom;

a second demultiplexer stage connected to said second shared buffer memory for demulitplexing ATM cells therefrom;

plurality of second switches for normally coupling ATM cell streams from said first demultiplexer stage to output ports of said ATM switching system and coupling ATM cell streams from said second demultiplexer stage, instead of from said first demultiplexer stage, to said output ports in response to said switching command signal.

16. A shared buffer ATM switching system as claimed in claim 15, wherein said first and second shared buffer memories are connected together to said multiplexer for storing a multiplexed ATM call stream in each of the first logical buffers and in each of said second logical buffers and forwarding the stored ATM cell streams therefrom, each of said second switches being responsive to a timing cell contained in an ATM cell stream for coupling an ATM cell strum from second demultiplexer stage to a corresponding one of said output ports.

17. An output buffer ATM switching system as claimed in claim 15, wherein said timing cell generator produces said timing cell at periodic intervals.

18. A switching method for an asynchronous transfer mode (ATM) switching system, comprising the steps of:

a) storing an ATM cell stream in first and second store-and-forward buffers and forwarding an ATM cell stream form each of the first and second store-and-forward buffers;

b) simultaneously producing a first cell count and a second cell count representative of numbers of cells stored in said first and second store-and-forward buffers, respectively;

c) detecting a difference between said first and second cell counts;

d) controlling said second store-and-forward buffer by advancing or stopping storing and forwarding in said second store-and-forward buffer in accordance with said difference so that the number of cells in said second store-and-forward buffer approaches the number of cells in said first store-and-forward buffer; and e) normally coupling said ATM cell stream forwarded from said first store-and-forward buffer to an output port of said ATM switching system and coupling said ATM stream forwarded from said second store-and-forward buffer, instead of from said first store-and-forward buffer, to said output port in response to a switching command signal.

19. A switching method as claimed in claim 18, further comprising the step of comparing first cell count with a threshold value and disabling the step (d) when said first cell count is smaller than said threshold value.

20. A switching method for an asynchronous transfer mode (ATM) switching system, comprising the steps of:

a) producing a timing cell;

b) multiplexing sad timing cell with ATM cells to produce a multiplexed ATM call stream;

c) storing the multiplexed ATM cell stream in first and second store-and-forward buffers and forwarding the multiplexed ATM cell stream from each of the first and second store-and-forward buffers;

d) detecting said timing cell multiplexed in said ATM cell stream and producing a first call count and a second call count representative of numbers of cells stored in the first and second store-and-forward buffers, respectively;

e) detecting a difference between said first and second cell counts;

f) controlling said second store-and-forward buffer in accordance with said difference so that the count of cells in said second store-and-forward buffer approaches the count of cells in the first store-and-forward buffer; and g) normally coupling the ATM cell stream forwarded from said first store-and-forward buffer to an output port of said ATM switching system and coupling the ATM cell stream forwarded from said second store-and-forward buffer, instead of from the first store-and-forward buffer, to said output port in reponse to a command signal.

21. A switching method as claimed in claim 20, wherein the step (g) comprises the steps of detecting said timing cell forwarded from one of said buffers and coupling the ATM cell stream forwarded from said second store-and-forward buffer to said output port at said instant the timing cell from one of the buffers is detected.

* * * * *

UNITED STATES PATENT AND TRADEMARK OFFICE
CERTIFICATE OF CORRECTION

PATENT NO. : 5,671,213
DATED : September 23, 1997
INVENTOR(S) : Takatoshi KURANO It is certified that error appears in the above-identified patent and that said Letters Patent is hereby corrected as shown below:

col. 1, line 64, delete "sane" and insert --same--, col. 2, line 22, delete "strum" and insert --stream--, col. 3, line 17, delete "translation" and insert --translators--, col. 4, line 55, delete "rich" and insert --each", col. 5, line 13, delete "span" and insert --spare--, col. 5, line 32, delete "span" and insert --spare--, col. 9, line 8, delete "cell" and insert --cells--,

UNITED STATES PATENT AND TRADEMARK OFFICE
CERTIFICATE OF CORRECTION

PATENT NO. : 5,671,213
DATED : September 23, 1997
INVENTOR(S) : Takatoshi KURANO It is certified that error appears in the above-identified patent and that said Letters Patent is hereby corrected as shown below:

col. 11, line 22, delete "strum" and insert --stream--, col. 12, line 15, delete "call" and insert --cell--, col. 12, line 21, delete "call," both occurrences, and insert --cell--, Signed and Sealed this Fourteenth Day of April, 1998

Attest:

BRUCE LEHMAN

*Attesting Officer*    *Commissioner of Patents and Trademarks*